June 25, 1957   P. A. HARTER   2,796,963
MAGNETIC CLUTCH WITH STATIONARY WINDING
Filed March 8, 1956   2 Sheets-Sheet 1

INVENTOR:
PAUL A. HARTER (Deceased)
By: ESTHER M. HARTER (Administratrix).

ATTORNEY

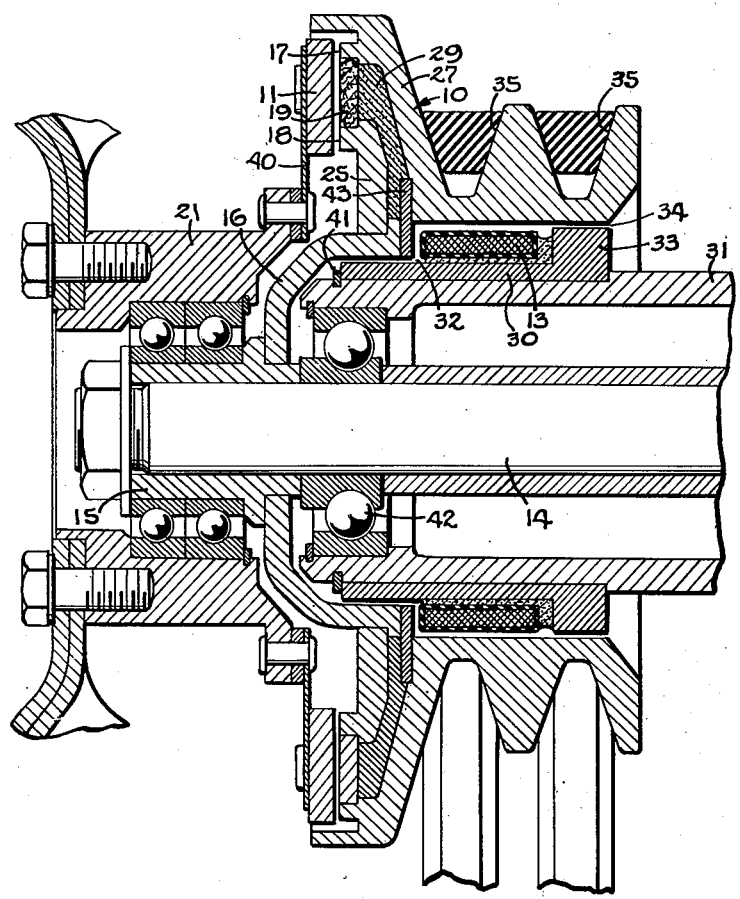

United States Patent Office 2,796,963
Patented June 25, 1957

2,796,963

MAGNETIC CLUTCH WITH STATIONARY WINDING

Paul A. Harter, deceased, late of Beloit, Wis., by Esther M. Harter, administratrix, Beloit, Wis.

Application March 8, 1956, Serial No. 570,386

9 Claims. (Cl. 192—84)

This invention relates to electromagnetic friction clutches of the type having a stationarily mounted winding and a magnetic flux circuit which extends through rotatable and interconnected inner and outer pole rings telescoping with cylindrical surfaces on a stationary core which carries the clutch winding.

The general object is to construct and arrange the pole rings and the stationary core in a novel manner to provide optimum radial compactness.

Another object is to provide a new and improved stationary field magnetic friction clutch in which the pole faces are substantially larger in diameter than the magnet winding whereby to increase the torque output of the clutch for a winding of given diameter.

A further object is to achieve radial compactness through the use of a magnet core of L-shaped radial cross section having long and short legs which telescope with the inner and outer pole rings.

Still another object is to arrange the pole rings in a novel manner which facilitates using the outer ring as a grooved pulley in a drive mechanism.

The invention also resides in the novel manner of mounting the pole ring unit.

Other objects and advantages of the invention will become apparent from the following detailed description taken in connection with the accompanying drawings, in which—

Fig. 2 is a similar view of a modification.

Figure 1:
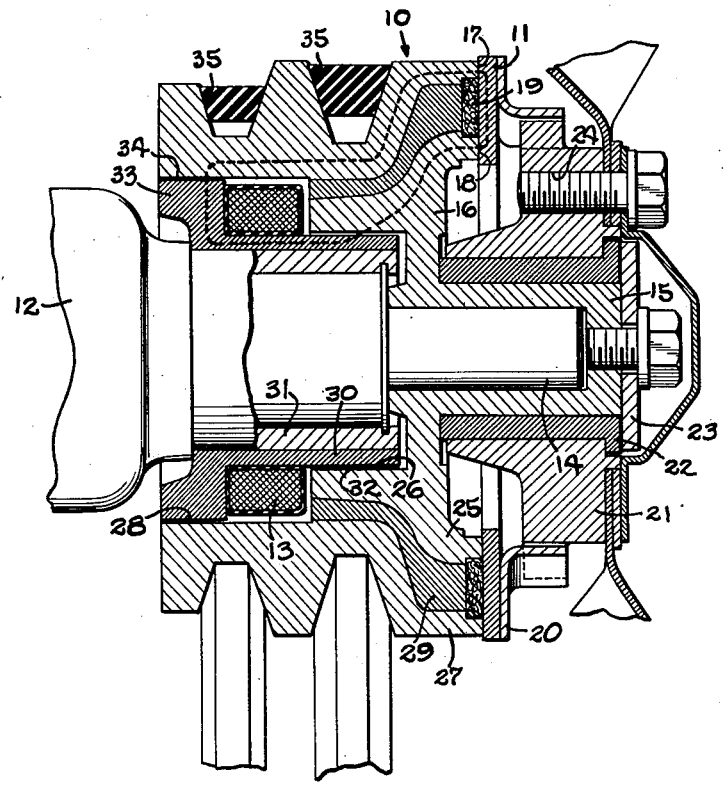
Figure 1 is a diametrical sectional view of the improved clutch and its mounting.

While the invention is susceptible of various modifications and alternative constructions, preferred embodiments thereof are shown in the drawings and will be described herein. It will be understood, however, that the invention is not to be limited by such disclosure but includes all modifications and alternative constructions falling within the spirit and scope of the invention as expressed in the appended claims.

Referring now to the drawings, the improved friction clutch comprises generally driving and driven elements 10 and 11 mounted on a nonrotatable support 12 to rotate about a common axis and adapted to be drawn into frictional gripping engagement by magnetic flux resulting from energization of a stationarily mounted multiple turn winding 13 encircling the clutch axis. Journaled in and projecting from the end of the support 12 is a shaft 14 keyed to and supporting a sleeve 15 having at its inner end a flange 16 which carries the driving clutch element 10. The friction face of the latter is defined by radially spaced annular poles 17 and 18 and an intervening wear plate 19 and is adapted, when the winding 13 is energized, to be drawn into axial gripping engagement with an armature which constitutes the driven element 11 of the clutch.

The armature comprises a flat ring of magnetic material which, in the form shown in Fig. 1, is backed by and secured to an intermediate ring 20 on a collar 21 pressed onto a bearing bushing 22. The latter is journaled on the sleeve 15 and positioned axially by the flange 16 and a disk 23 clamped to the sleeve end. By screws threading into holes 24, the collar may be coupled to a part to be driven such as the fan blade shown.

The inner pole face 18 of the magnet is formed on one end of a magnetic ring or pole piece 25 integral intermediate its ends with the outer periphery of the sleeve flange 16 from which the opposite end of the ring projects to provide a cylindrical surface 26 concentric with the clutch axis. The outer pole piece is a tubular ring 27 rigid with but magnetically separated from the inner ring 25 and projecting well beyond the inner end of the latter to provide a cylindrical surface 28 of somewhat larger diameter than and in this instance axially spaced inwardly from the surface 26 of the inner ring.

The two rings are separated radially by a mass 29 of nonmagnetic material which may, for example, be copper suitably bonded to the opposed surfaces of the rings. The latter are thus joined into a rigid pole piece unit constituting the driving clutch element 10 and supported by the shaft 14 substantially in the plane of the friction faces of the clutch.

Cooperating with the armature 11 and the pole rings 25 and 27 to complete a substantially closed flux path of toroidal shape around the winding 13 is a sleeve 30 of magnetic iron herein pressed onto and fixed to a hub 31 projecting from the support 12. While the outer end of this sleeve may surround the inner end portion of the inner pole ring 25, it is made larger than that ring in the present instance and projects into the inner end of the ring and telescopes closely with the internal surface 26 to provide a gap 32 of narrow radial width and substantially axial length. A substantially right angular and outturned flange 33 is integral with the other end of the sleeve 30 and has an outer peripheral surface 34 closely telescoping with the surface 28 on the outer pole ring 27. The winding 13 encircles the sleeve 30 and is cemented or otherwise secured to the latter between the flange 33 and the inner end of the inner pole ring. By elongating the winding in an axial direction and mounting the same on the long leg 30 of the L-shaped magnetic core, the flange 33 or short leg of the core may be of relatively narrow radial width thus contributing to the overall radial compactness of the clutch.

When the winding is energized, magnetic flux threads a toroidal flux path which is shown in dotted outline and which extends radially through the narrow gaps 32 and 34 and axially between the pole faces 17 and 18 and the armature 11. The friction faces of the armature and magnet are thus drawn into gripping engagement to produce a torque proportional in magnitude to the energizing current.

By constructing the stationary part of the magnet core as a flanged sleeve and of substantially L-shaped cross section, the gap 34 within the outer ring may be of minimum diameter and only slightly larger than the winding 13. At the same time, by flaring the outer ends of the pole rings outwardly, the moment arm of the friction force derived from the engagement of the clutch surfaces is increased substantially and the torque output of the clutch augmented correspondingly. Advantage is taken of the outward flaring of the pole rings 25 and 27 to provide within the diameter of the friction faces of the clutch proper space for grooves 35 for receiving V-belts by which the clutch element 10 may be driven. Herein there are two grooves axially spaced apart and formed in the exterior of the thickened inner end portion of the outer pole ring 27, one side wall of the outer groove being formed by the flared portion of the pole ring.

The winding 13 is designed and the areas of the air gaps 32 and 34 are sized to provide substantial flux saturation of the pole faces 17 and 18 when the winding is energized. The inner pole ring 25 telescopes with the smaller leg of the L-core over a greater axial length of the latter than the length of the larger air gap around the periphery of the shorter core leg 33.

The clutch shown in Fig. 2 is of generally similar construction and the same reference numerals are applied to corresponding parts. In this instance, the armature 11 is supported by angularly spaced leaf springs 40 extending tangentially with opposite ends secured as by rivets to the back of the armature and the driven element 21. As before, the L-shaped magnet core is fixed as by a snap ring 41 to a nonrotatable tube 31 in which the drive shaft 14 is journaled through bearings 42.

In this instance, the sleeve 15, the flange 16 and the inner pole ring 25 are formed as separate parts press fitted together to telescope with the exterior of the long leg 30 of the L-shaped core and at the same time locate the inner pole face 18 outwardly well beyond the diameter of the winding 13. The rings 25 and 27 are joined by a suitable filling 29 and connected rigidly adjacent the inner end of the winding by a flat ring 43 of nonmagnetic material welded around its inner and outer margins to opposed axially facing surfaces of the pole rings.

The roots of the belt grooves 35 are, in this instance, reduced in diameter by elongating the winding 13 in an axial direction. In this way, the maximum diameter of the clutch may be adjusted readily to suit the space available in a given installation.

This application is a continuation-in-part of the copending application of Paul A. Harter, Serial No. 299,291, filed July 16, 1952, now abandoned.

The claimed invention is:

1. In a magnetic clutch, the combination of, a stationarily mounted sleeve of magnetic material and L-shaped radial cross section having cylindrical outer peripheral surfaces of different diameters disposed at opposite ends of the sleeve concentric with the axis thereof, a pair of tubular pole pieces of magnetic material and different lengths closely telescoping at one of their ends with the respective ones of said surfaces and terminating at the opposite ends in radially spaced pole faces coacting to form an axially facing friction surface, nonmagnetic means rigidly connecting said pole pieces intermediate their ends to form a rigid unit, and means rotatably supporting said unit to turn about the axis of said peripheral surfaces including a sleeve connected rigidly with the inner pole piece beyond one end of said first mentioned sleeve.

2. In a magnetic clutch, the combination of, separately formed inner and outer rings of magnetic material telescoping with each other and terminating at one end in radially spaced pole faces facing axially and disposed in a common plane, nonmagnetic means rigidly connecting said rings together to form a rigid pole piece unit, means rotatably supporting said unit to turn about the axis of said rings, said inner and outer rings having cylindrical surfaces axially spaced apart and concentric with said axis, a stationarily mounted magnetic sleeve having one end portion closely telescoping with the inner one of said surfaces, an outturned flange rigid with the opposite end of said sleeve and closely telescoping with the outer one of said cylindrical surfaces, and an annular multiple turn winding mounted on and enclosing said sleeve adjacent said flange.

3. In a magnetic clutch, the combination of, a magnetic core ring of L-shaped radial cross section having an elongated cylindrical flange and a shorter outturned radial flange at one end of the cylindrical flange, an annular multiple turn winding surrounding said cylindrical flange and supported by the latter adjacent said radial flange, an inner magnetic pole ring mounted to turn about the axis of said cylindrical flange and closely telescoping at one end with the cylindrical flange to provide an axially elongated air gap of narrow radial width, the other end portion of said inner ring projecting beyond said winding and said cylindrical flange and terminating in an axially facing pole face, an outer magnetic pole ring enclosing said inner ring, said winding and said radial flange and closely telescoping at one end with the outer periphery of the radial flange to provide a second narrow radial air gap axially shorter than said first gap, the other end of said outer ring terminating in an outer axially facing pole face, and nonmagnetic means disposed beyond the end of said cylindrical flange and rigidly joining said inner and outer rings and holding said pole faces substantially flush with each other.

4. In a magnetic clutch, the combination of, an annular multiple turn winding, an elongated magnetic sleeve longer than and projecting through said winding so as to support the latter, an outturned flange integral with one end of said sleeve adjacent one end of said winding, said flange terminating in an external edge surface concentric with the sleeve axis, means by which said sleeve may be supported stationarily, an inner magnetic ring mounted to turn about said sleeve axis and having an end portion closely telescoping with said sleeve including the portion thereof beyond the other end of said winding, said ring projecting from said sleeve and terminating in an axially facing inner pole face of substantially larger diameter than the sleeve, an outer pole ring surrounding said inner ring and said sleeve and closely telescoping near one end with said flange surface, the other end of the outer ring terminating in an axially facing pole face larger than said inner pole face, nonmagnetic means rigidly joining the projecting end portions of said inner and outer rings to locate said pole faces in a common plane, and a magnetic armature spanning and adapted for axial gripping engagement with said pole faces and cooperating with said rings, said sleeve and said flange to provide a toroidal flux path including the axially spaced cylindrical gaps between said flange and outer ring and between said sleeve and inner ring, said armature being rotatable about said sleeve axis.

5. In a magnetic clutch, the combination of, an elongated tubular magnetic core ring adapted to be mounted stationarily, a multiple turn annular winding surrounding and supported by said core ring intermediate the ends of the latter, a rotatable inner magnetic pole ring closely telescoping at one end with said core ring to form a narrow radial gap, the other end portion flaring outwardly and terminating at its end in an axially facing pole face of larger diameter than said winding, an outer magnetic pole ring surrounding said inner ring and said winding and closely telescoping at one end with said core ring to provide a narrow radial gap axially spaced from said first gap and disposed at the opposite end of said winding, the other end of said outer ring flaring outwardly and terminating in an axially facing pole face of larger diameter than said first face, nonmagnetic means rigidly joining said inner and outer rings, and a rotatable armature ring spanning said pole faces and adapted to be drawn into axial gripping engagement therewith by flux threading a toroidal path through said rings and said gaps and around said winding when the latter is energized.

6. In a magnetic clutch, the combination of, an elongated tubular magnetic core ring adapted to be mounted stationarily, a multiple turn annular winding surrounding and supported by said core ring intermediate the ends of the latter, a rotatable inner magnetic pole ring closely telescoping at one end with said core ring to form a narrow radial gap at one end of said winding, the other end portion terminating at its end in an axially facing pole face, an outer magnetic pole ring surrounding said inner ring and said winding and closely telescoping at one end with said core ring to provide a narrow radial gap at the opposite end of said winding, the other end of said outer ring terminating in an axially facing pole face, nonmagnetic means rigidly joining said inner and outer rings, and a rotatable armature ring spanning said pole faces and adapted to be drawn into axial gripping engagement therewith by flux threading a toroidal path through said rings and said gaps and around said winding when the latter is energized.

7. In a magnetic clutch, the combination of, a magnetic core ring L-shape comprising a cylindrical sleeve and a narrow outturned radial flange at one end thereof, an annular multiple turn winding smaller in diameter than said flange and surrounding and supported by said sleeve adjacent the flange, an elongated tubular inner magnetic pole ring mounted to turn about the axis of said sleeve and having one end portion telescoping closely with the sleeve to define a narrow radial air gap, the other end portion of said ring being turned outwardly beyond the sleeve to an axially facing pole face larger in diameter than said flange, an elongated tubular outer magnetic pole ring enclosing said inner ring and closely telescoping at one end with the outer periphery of said flange to define a second narrow radial air gap, the other end portion of said outer ring flaring outwardly and terminating in an outer axially facing pole face substantially flush with said first pole face, and nonmagnetic means rigidly joining said inner and outer rings.

8. In a magnetic clutch, the combination of, a magnetic core ring comprising a cylindrical sleeve and an outturned flange at one end thereof, an annular multiple turn winding surrounding said sleeve and supported thereby adjacent said flange, an elongated tubular inner magnetic pole ring mounted to turn about the axis of said sleeve and having one portion telescoping closely with the sleeve to define a narrow radial air gap, said inner pole ring having a flange portion turned outwardly to form an axially facing pole face larger in diameter than said winding, an elongated tubular outer magnetic pole ring enclosing said inner ring and closely telescoping at one end with the outer periphery of said flange to define a second narrow radial air gap, the other end portion of said outer ring extending outwardly beyond said inner pole face nad terminating in an outer axially facing pole face substantially flush with the inner pole face, and nonmagnetic means rigidly joining said inner and outer rings.

9. A magnetic clutch as defined by claim 8 in which a belt groove of V-shaped cross section is formed around the outer periphery of said outer ring and one side wall of the groove is defined by the outwardly turned portion of the outer ring.

References Cited in the file of this patent
UNITED STATES PATENTS

| | | |
|---|---|---|
| 2,039,714 | Fuller | May 5, 1936 |
| 2,549,214 | Lilja | Apr. 17, 1951 |
| 2,729,318 | Harter | Jan. 3, 1956 |

FOREIGN PATENTS

| | | |
|---|---|---|
| 194,274 | Germany | Jan. 22, 1908 |